(12) United States Patent
Quaglino et al.

(10) Patent No.: US 10,056,844 B2
(45) Date of Patent: Aug. 21, 2018

(54) SELF SUPPLY FOR SYNCHRONOUS RECTIFIERS USING OFF STATE REVERSE VOLTAGE

(71) Applicant: Infineon Technologies Austria AG, Villach (AT)

(72) Inventors: Roberto Quaglino, Villach (AT); Giuseppe Bernacchia, Villach (AT)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 15/625,390

(22) Filed: Jun. 16, 2017

(65) Prior Publication Data

US 2017/0310230 A1   Oct. 26, 2017

Related U.S. Application Data

(63) Continuation of application No. 14/610,586, filed on Jan. 30, 2015, now Pat. No. 9,716,439.

(51) Int. Cl.
| | |
|---|---|
| *H02M 3/335* | (2006.01) |
| *G05F 1/46* | (2006.01) |
| *H02M 3/07* | (2006.01) |

(52) U.S. Cl.
CPC ........ *H02M 3/33592* (2013.01); *G05F 1/468* (2013.01); *H02M 3/07* (2013.01)

(58) Field of Classification Search
None
See application file for complete search history.

(56) References Cited

U.S. PATENT DOCUMENTS

| | | |
|---|---|---|
| 6,038,148 A | 3/2000 | Farrington et al. |
| 6,256,214 B1 | 7/2001 | Farrington et al. |
| (Continued) | | |

FOREIGN PATENT DOCUMENTS

| | | |
|---|---|---|
| CN | 1256550 A | 6/2000 |
| CN | 1296661 A | 5/2001 |
| (Continued) | | |

OTHER PUBLICATIONS

Office Action, in the German language, from counterpart German Application No. 102016101301.3, dated Aug. 7, 2017, 6 pp.
(Continued)

*Primary Examiner* — Adolf Berhane
*Assistant Examiner* — Henry Lee, III
(74) *Attorney, Agent, or Firm* — Shumaker & Sieffert, P.A.

(57) ABSTRACT

A power converter with an isolated topology may include a primary side and a secondary side. The secondary side includes a self-powered synchronous rectifier. The synchronous rectifier includes a synchronous rectifier transistor having at least a drain and a gate, a voltage regulator having at least an input that is coupled to the drain of the synchronous rectifier transistor, and an auxiliary transistor having at least a drain that is coupled to the drain of the synchronous rectifier transistor. The auxiliary transistor is on a same die as the synchronous rectifier transistor. The synchronous rectifier also includes a clamping device having at least an output that is coupled to the gate of the auxiliary transistor, and a gate driver circuit having at least: a power supply input that is coupled to the output of the voltage regulator, and an output that is coupled to a gate of the synchronous rectifier transistor.

18 Claims, 11 Drawing Sheets

FIG. 2

(56) References Cited

U.S. PATENT DOCUMENTS

| | | | |
|---|---|---|---|
| 6,678,172 B1 | 1/2004 | Zhang et al. | |
| 6,882,548 B1* | 4/2005 | Jacobs | H02M 1/34 363/127 |
| 7,319,601 B2 | 1/2008 | Fagnani et al. | |
| 2002/0163322 A1 | 11/2002 | Saxelby et al. | |
| 2008/0002446 A1 | 1/2008 | Selgi et al. | |
| 2008/0068868 A1* | 3/2008 | Williams | H01L 27/0605 363/21.06 |
| 2009/0140712 A1 | 6/2009 | Giombanco et al. | |
| 2009/0224734 A1* | 9/2009 | Tang | H03K 17/164 323/272 |
| 2010/0182806 A1* | 7/2010 | Garrity | H02M 3/33569 363/21.14 |
| 2010/0271850 A1 | 10/2010 | Huang et al. | |
| 2011/0095742 A1* | 4/2011 | Lopata | H02M 3/1588 323/283 |
| 2011/0317452 A1* | 12/2011 | Anguelov | H02M 3/33584 363/21.02 |
| 2014/0268915 A1 | 9/2014 | Kong et al. | |
| 2014/0285100 A1 | 9/2014 | Akahoshi et al. | |
| 2016/0226389 A1 | 8/2016 | Quaglino et al. | |

FOREIGN PATENT DOCUMENTS

| | | |
|---|---|---|
| CN | 1350717 A | 5/2002 |
| CN | 1534855 A | 10/2004 |
| CN | 101471609 A | 7/2009 |
| DE | 60225603 T2 | 4/2009 |

OTHER PUBLICATIONS

Prosecution History from U.S. Appl. No. 14/610,586, filed Oct. 11, 2016 through Mar. 29, 2017, 31 pp.

Office Action, in Chinese language, from counterpart Chinese Patent Application No. 201610056063.8, dated Nov. 17, 2017, 12 pp.

* cited by examiner

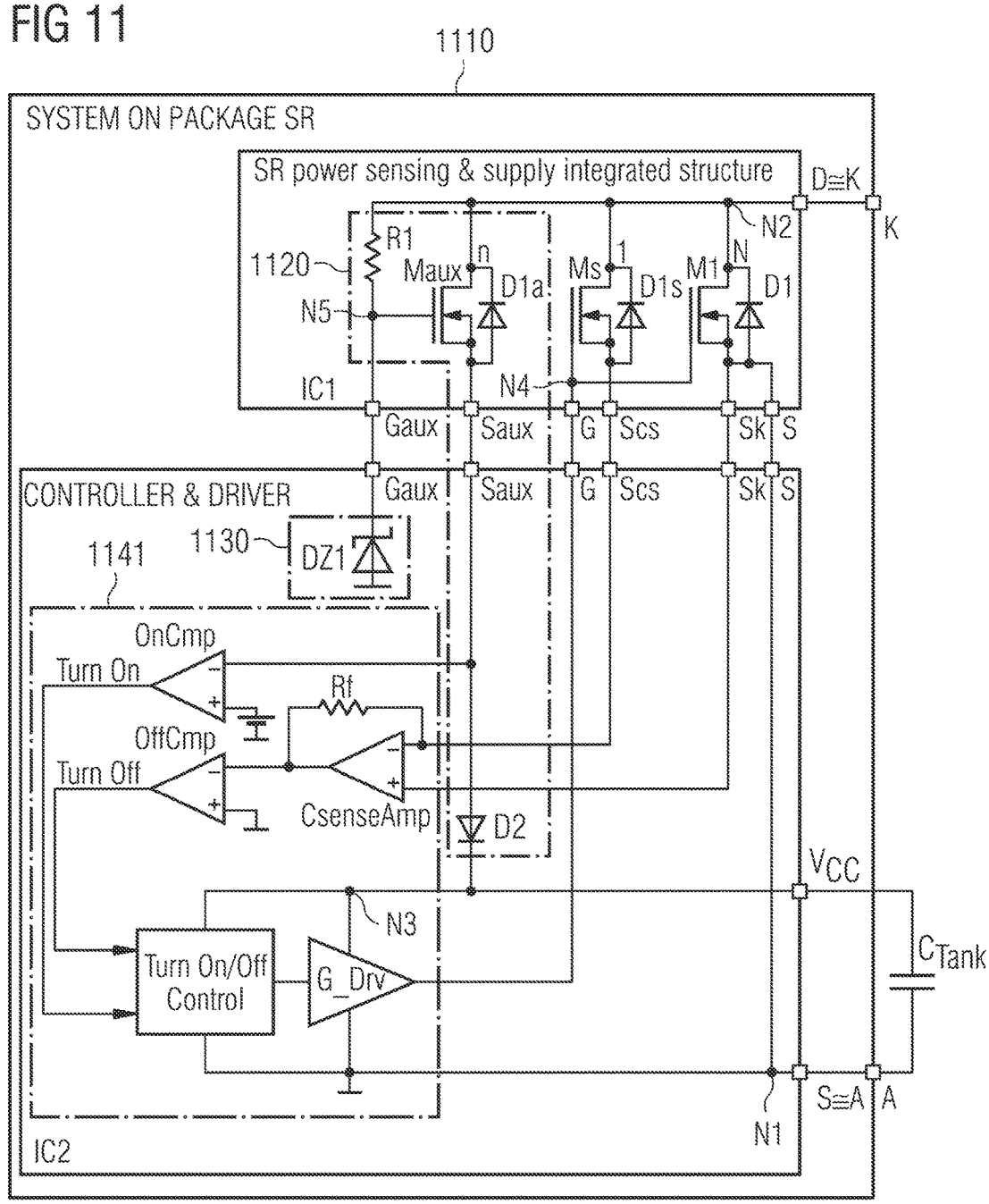

SELF SUPPLY FOR SYNCHRONOUS RECTIFIERS USING OFF STATE REVERSE VOLTAGE

This application is a continuation of U.S. application Ser. No. 14/610,586, filed Jan. 30, 2015, the entire content of which is hereby incorporated by reference.

TECHNICAL FIELD

This disclosure relates to power converters, and more specifically to power converters having isolated topologies.

BACKGROUND

Rectification on the secondary side of a power converter with an isolated topology is typically accomplished with one (or more) diodes. However, a diode rectifier on the secondary side of a power converter having an isolated topology may be replaced with a synchronous rectifier, which may be any suitable type of power transistor used in place of a standard diode. A synchronous rectifier is typically a Silicon power MOSFET. Due to the nature of the switching in the power converter, control of the synchronous rectifiers can be quite difficult and may require extra hardware.

SUMMARY

In general, the disclosure is directed to a method and device in which a power converter with an isolated topology may include a primary side and a secondary side. The secondary side includes a self-powered synchronous rectifier. The self-powered synchronous rectifier includes a synchronous rectifier transistor having at least a drain and a gate. The self-powered synchronous rectifier also includes a voltage regulator having at least an input that is coupled to the drain of the synchronous rectifier transistor, and an output. The voltage regulator includes an auxiliary transistor having at least a drain that is coupled to the drain of the synchronous rectifier transistor. The auxiliary transistor is on a same die as the synchronous rectifier transistor. The self-powered synchronous rectifier also includes a clamping device having at least an output that is coupled to the gate of the auxiliary transistor. The self-powered synchronous rectifier also includes a gate driver circuit having at least a power supply input that is coupled to the output of the voltage regulator, and an output that is coupled to the gate of the synchronous rectifier transistor.

In some examples, a device comprises a power converter having an isolated topology. The power converter includes a primary side and a secondary side. The secondary side includes a self-powered synchronous rectifier. The self-powered synchronous rectifier includes: a synchronous rectifier transistor having at least a drain and a gate; a voltage regulator having at least an input that is coupled to the drain of the synchronous rectifier transistor, and an output, wherein the voltage regulator includes: an auxiliary transistor having at least a drain that is coupled to the drain of the synchronous rectifier transistor, and a gate, wherein the auxiliary transistor is on a same die as the synchronous rectifier transistor; a clamping device having at least an output that is coupled to the gate of the auxiliary transistor; and a gate driver circuit having at least a power supply input that is coupled to the output of the voltage regulator, and an output that is coupled to the gate of the synchronous rectifier transistor.

In some examples, a method comprises using a gate driver circuit to drive a gate of a synchronous rectifier transistor, wherein the synchronous rectifier transistor is part of a secondary side of a power converter having an isolated topology; using a voltage regulator to convert a voltage at a drain of the synchronous rectifier transistor into a regulated voltage, wherein the voltage regulator includes an auxiliary transistor having a drain that is coupled to the drain of the synchronous rectifier transistor, and wherein the auxiliary transistor is on a same die as the synchronous rectifier transistor; clamping a voltage at a gate of the auxiliary transistor; and providing the regulated voltage to the gate driver circuit as a power supply of the gate driver circuit.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

Non-limiting and non-exhaustive examples of the present disclosure are described with reference to the following drawings.

FIG. 11 is a block diagram illustrating another example of the synchronous rectifier of FIG. 7, in accordance with aspects of the present disclosure.

DETAILED DESCRIPTION

Figure 1:
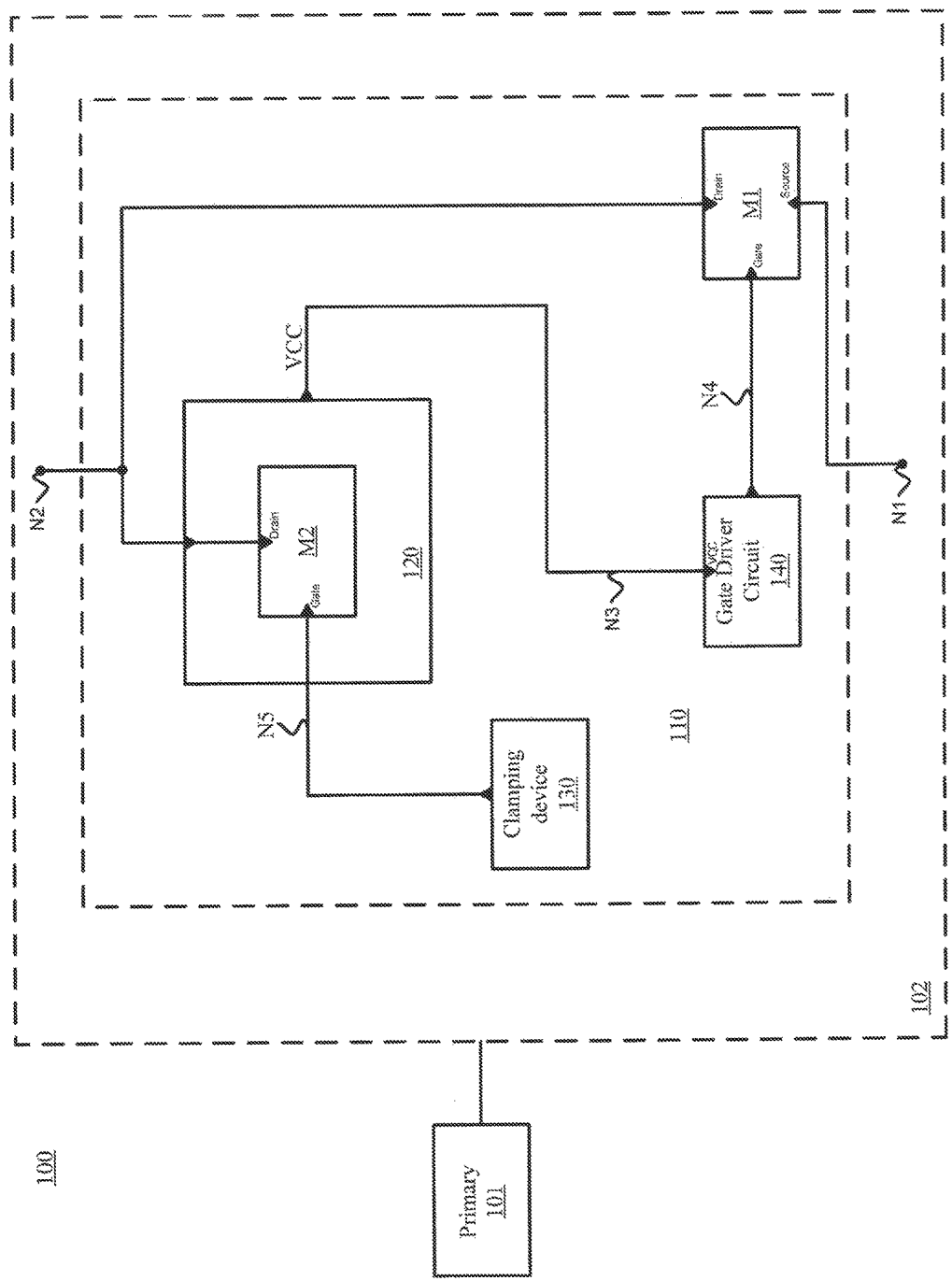
FIG. 1 is a block diagram illustrating an example of a power converter including a synchronous rectifier.

Various examples of this disclosure will be described in detail with reference to the drawings, where like reference numerals represent like parts and assemblies throughout the several views. Reference to various examples does not limit the scope of this disclosure which is limited only by the scope of the claims attached hereto. Additionally, any examples set forth in this specification are not intended to be limiting and merely set forth some of the many possible examples of this disclosure.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," or "in one example," as used herein does not necessarily refer to the same embodiment or example, although it may. Similarly, the phrase "in some embodiments," or "in some examples," as used herein, when used multiple times, does not necessarily refer to the same embodiments or examples, although it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. Where suitable, the term "gate" is intended to be a generic term covering both "gate" and "base"; the term "source" is intended to be a generic term covering both "source" and "emitter"; and the term "drain" is intended to be a generic term covering both "drain" and "collector." The term "coupled" means at least either a direct electrical connection between the items connected, or an indirect connection through one or more passive or active intermediary devices. The term "signal" means at least one current, voltage, charge, temperature, data, or other signal.

FIG. 1 is a block diagram illustrating an example of power converter 100, which includes a primary side 101 and a secondary side 102, where secondary side 102 includes synchronous rectifier 110. In some examples, synchronous rectifier 110 is a self-powered synchronous rectifier that includes synchronous rectifier transistor M1, voltage regulator 120, clamping device 130, and gate driver circuit 140. Voltage regulator 120 includes auxiliary transistor M2. Auxiliary transistor M2 is on the same die as synchronous rectifier transistor M1.

In the example of FIG. 1, transistor M1 has at least a source that is coupled to node N1, a drain that is coupled to node N2, and a gate that is coupled to node N4. Transistor M2 has at least a drain that is coupled to node N2 and a gate that is coupled to node N5. Gate driver 140 has at least a power supply input that is coupled to node N3 and an output that is coupled to node N4. Clamping device 130 has at least an output that is coupled to node N5. Voltage regulator 120 has an input that is coupled to node N2 and an output that is coupled to node N3. Voltage regulator 120 is arranged to provide regulated voltage VCC at the output of voltage regulator 120.

FIG. 1 represents various open-ended examples of power converter 100 that does not necessarily show all components or connections present in power converter 100. Nodes without connections in FIG. 1 are not necessarily floating nodes, and devices not shown in FIG. 1 is not intended to indicate that complete functionality can necessarily be accomplished without such devices. Rather, FIG. 1 is an open-ended drawing that is intended to encompass many different examples, where several such examples are illustrated and discussed in greater detail below.

Figure 2:
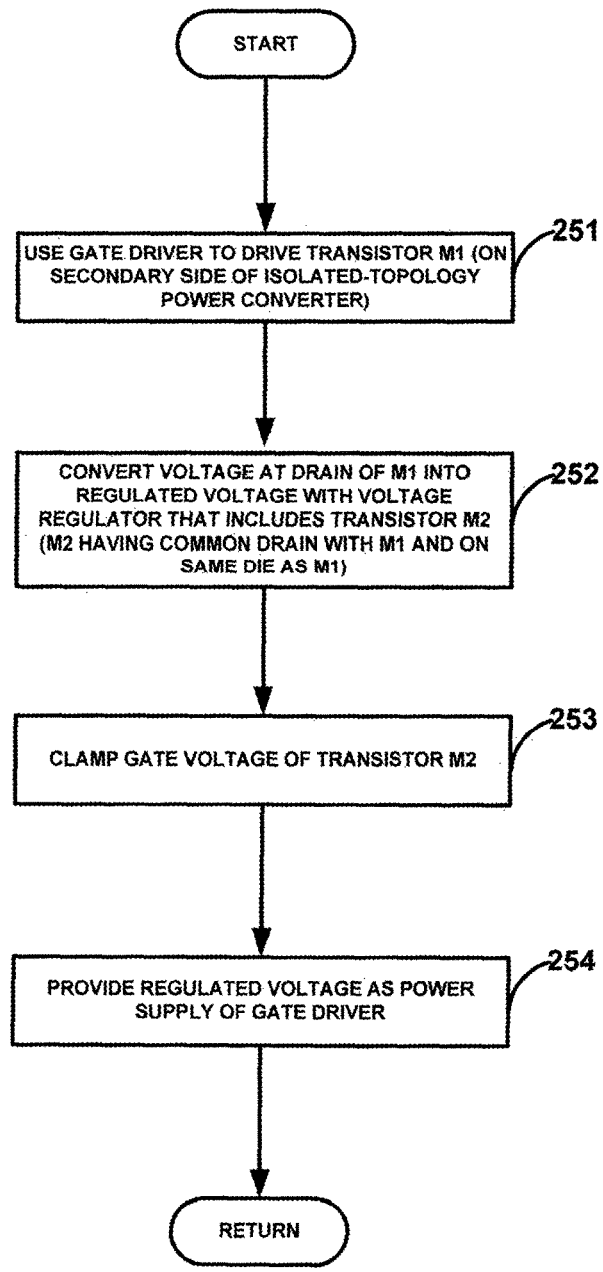
FIG. 2 is a flowchart illustrating an example of a process that may be employed by an example of the power converter of FIG. 1.

FIG. 2 is a flowchart illustrating an example of a process 250, which may be employed by an example of power converter 100 of FIG. 1. After a start block, a gate driver circuit (e.g., gate driver circuit 140 of FIG. 1) drives a gate of a synchronous rectifier transistor (e.g., transistor M1 of FIG. 1) (251). The synchronous rectifier transistor (e.g., transistor M1) is on a secondary side (e.g., secondary side 102 of FIG. 1) of a power converter (e.g., power converter 100 of FIG. 1) having an isolated topology.

Next, a voltage regulator (e.g., voltage regulator 120 of FIG. 1) converts a voltage at the drain of the synchronous rectifier transistor (e.g., transistor M1) into a regulated voltage (e.g., voltage VCC of FIG. 1) (252). The voltage regulator (e.g., 120) includes an auxiliary transistor (e.g., transistor M2 of FIG. 1) having a drain that is coupled to the drain of the synchronous rectifier transistor (e.g., M1). Also, the auxiliary transistor (e.g., M2) is on a same die as the synchronous rectifier transistor (e.g., M1).

Then, a clamping device (e.g., clamping device 130 of FIG. 1) clamps a voltage at the gate of the auxiliary transistor (e.g., transistor M2) (253). Next, the voltage regulator (e.g., voltage regulator 120 of FIG. 1) provides the regulated voltage (e.g., VCC) to the gate driver circuit (e.g., 140) as a power supply of the gate driver circuit (254). The process then advances to a return block, where other processing is resumed.

Figure 3:
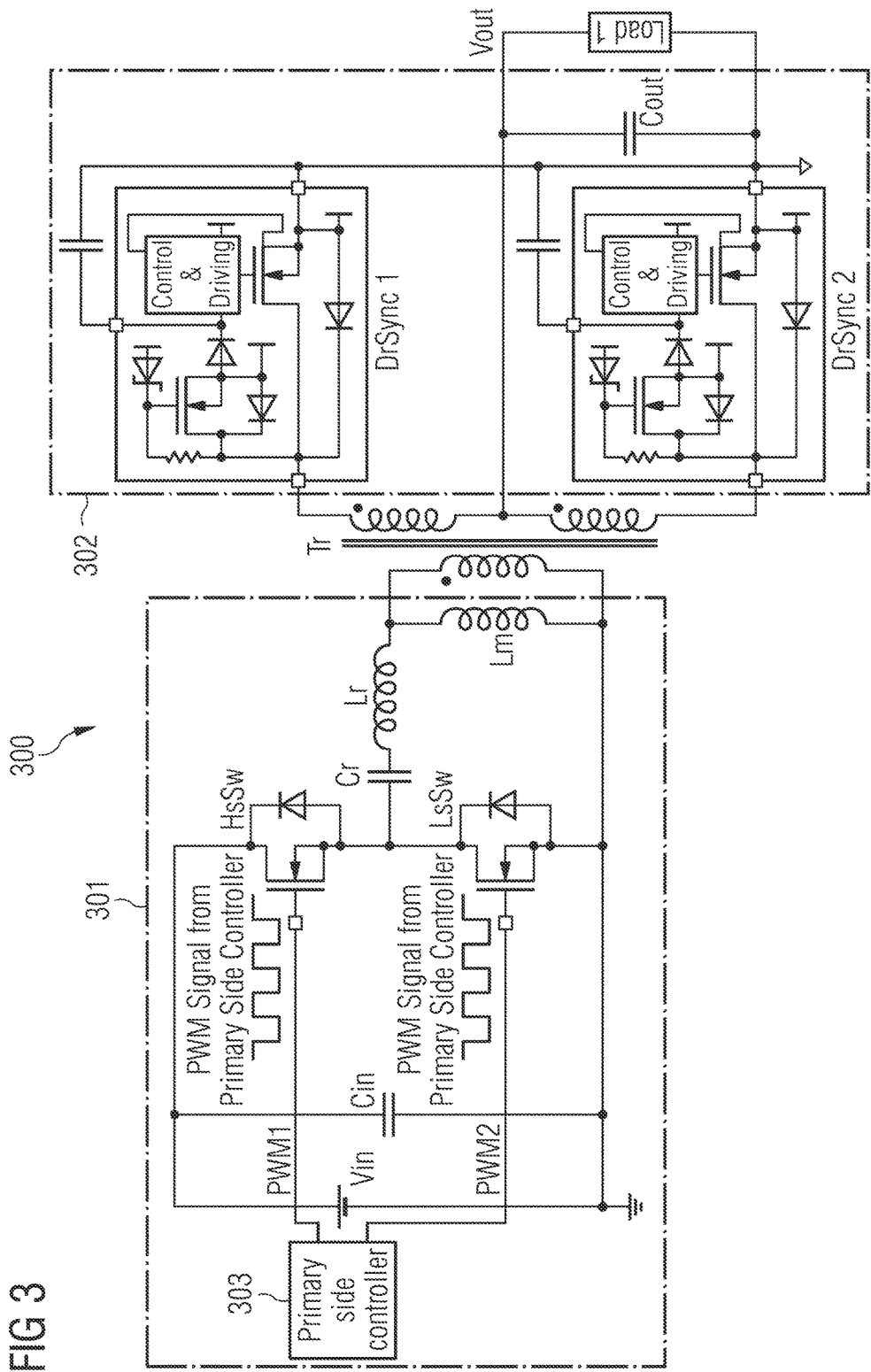
FIG. 3 is a block diagram illustrating an example of the power converter of FIG. 1 in which the power converter is an LLC converter with a center-tap rectifier at the secondary side of the power converter with self-powered synchronous rectifiers referred to the ground at the secondary side.

FIG. 3 is a block diagram illustrating an example of load Load1 and power converter 300, which may be employed as an example of power converter 100 of FIG. 1 in which the power converter (300) is an LLC converter with a center-tap rectifier at the secondary side (302) of the power converter with self-powered synchronous rectifiers (DrSynk1 and DrSynk2) referred to the ground at the secondary side (302). Power converter 300 further includes transformer Tr. An example of primary side 301 includes input voltage source Vin, primary side controller 303, capacitor Cin, capacitor Cr, inductors Lr and Lm, switch IlsSw, and switch LsSw. An example of secondary side 302 includes output capacitor Cout, self-powered synchronous rectifier DrSynk1, and self-powered synchronous rectifier DrSynk2. Self-powered synchronous rectifiers DrSynk1 and DrSynk2 are example of self-powered synchronous rectifier 110 of FIG. 1. FIG. 3 shows an example of use of a resonant LLC converter (300) with center-tap rectification at the secondary side (302) where the self-powered synchronous rectifiers DrSynk1 and DrSynk2 are referred to the ground at the secondary side (302). In some examples, primary side controller 303 is arranged to provide PWM signal PWMSignal1 to the gate of switch HsSw, and to provide PWM signal PWMSignal2 to the gate of switch LsSw.

Figure 4:
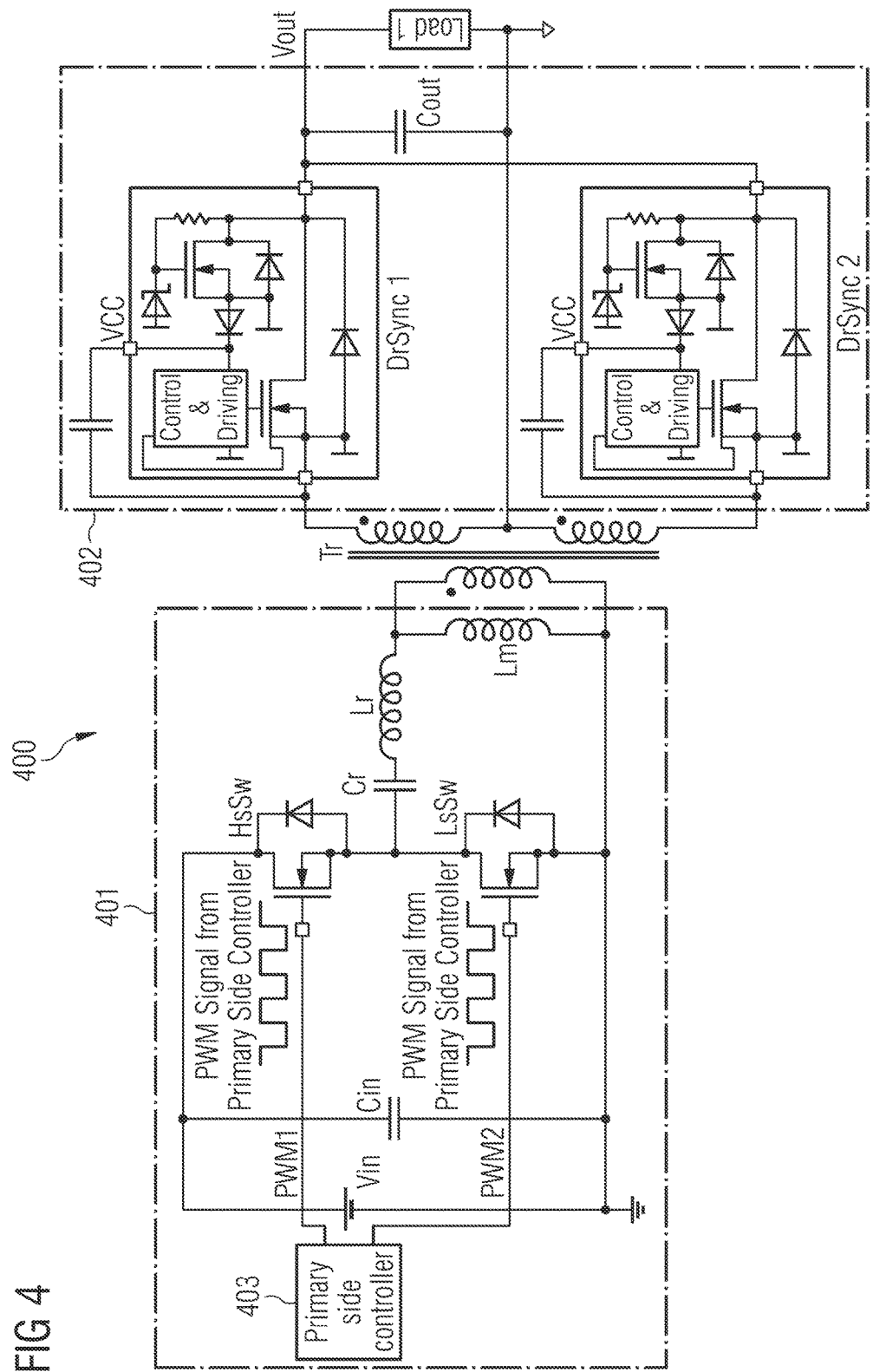
FIG. 4 is a block diagram illustrating an example of the power converter of FIG. 1 in which the power converter is an LLC converter with a center-tap rectifier at the secondary side of the power converter with self-powered synchronous rectifiers used as floating diodes.

FIG. 4 is a block diagram illustrating an example of load Load1 and power converter 400, which may be employed as an example of power converter 100 of FIG. 1 in which the power converter is an LLC converter with a center-tap rectifier at the secondary side (402) of the power converter (400) with self-powered synchronous rectifiers (DrSynk1 and DrSynk2) used as floating diodes. In power converter 400, as illustrated in FIG. 4, the self-powered synchronous rectifiers (DrSynk1 and DrSynk2) may be used as floating diodes. In some examples, like power converter 300 of FIG. 3, power converter 400 is an LLC switch-mode power supply (SWPS) with secondary center-tapped rectifiers (DrSynk1 and DRSynk2).

Figure 5:
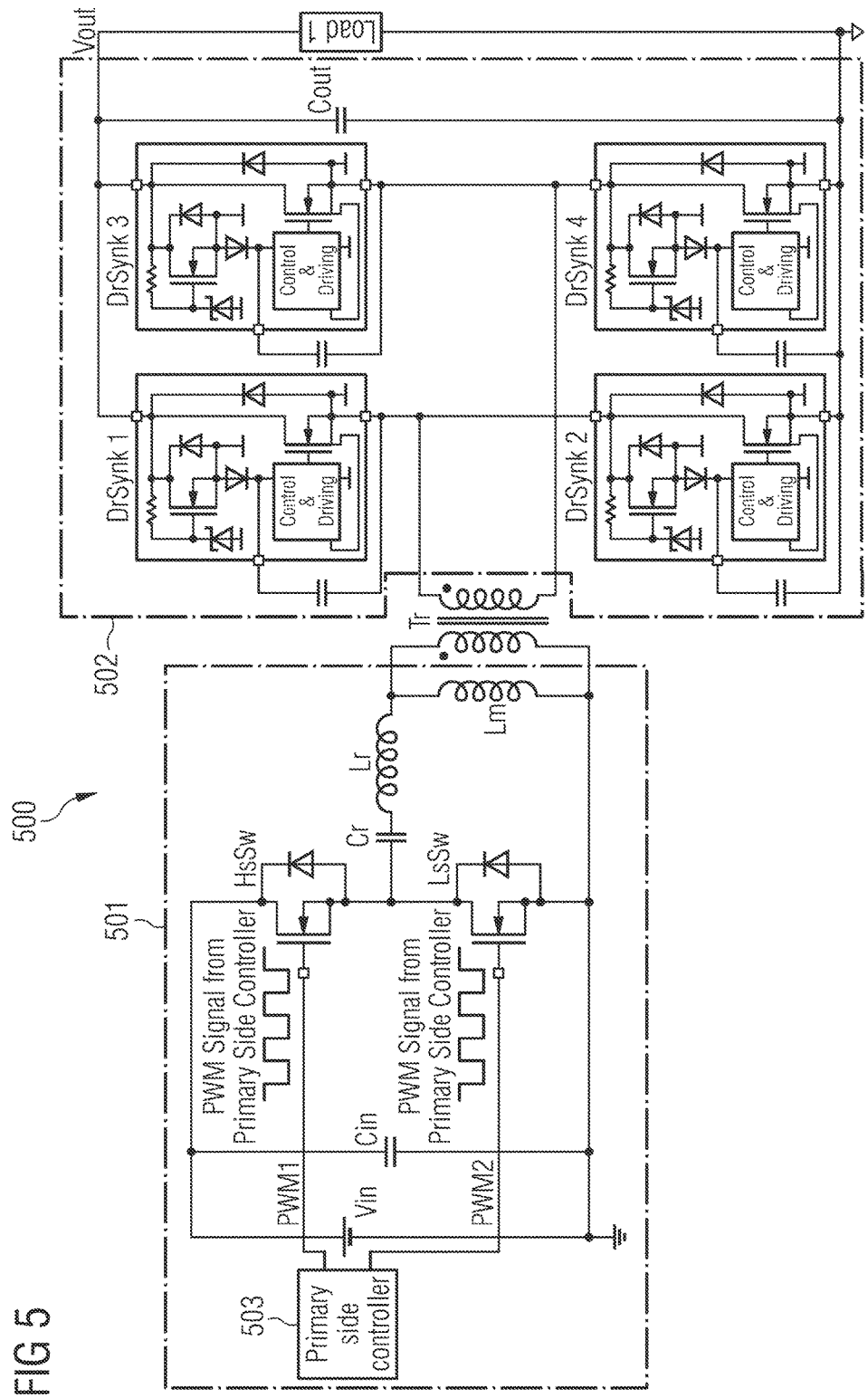
FIG. 5 is a block diagram illustrating an example of the power converter of FIG. 1 in which the power converter is an LLC converter with secondary full-bridge rectification.

FIG. 5 is a block diagram illustrating an example of load Load1 and power converter 500, which may be employed as an example of power converter 100 of FIG. 1 in which the power converter (500) is an LLC converter with secondary full-bridge rectification. In some examples, secondary side 502 further includes self-powered rectifiers DrSynk3 and DrSynk4. Like power converter 400, in some examples, power converter 500 employs the synchronous rectifiers (DrSynk1, DrSynk2, DrSynk3, and DrSynk4) as floating diodes. In some examples, the secondary side 502 of power converter 500 employs a full bridge synchronous rectification topology.

In one example, power converter 500 includes two low-side self-powered synchronous rectifiers 510 and two high-side self-powered synchronous rectifiers 510. In some examples, the low-side self-powered synchronous rectifiers share a common tank capacitor Ctank.

FIGS. 3-5 show topologies of examples of power converter 100 in which example(s) one or more self-powered synchronous rectifiers 110 may be employed. However, these examples are not limiting, and any other suitable isolated power converter topology may be employed, including, as one example, a flyback topology.

Figure 6:
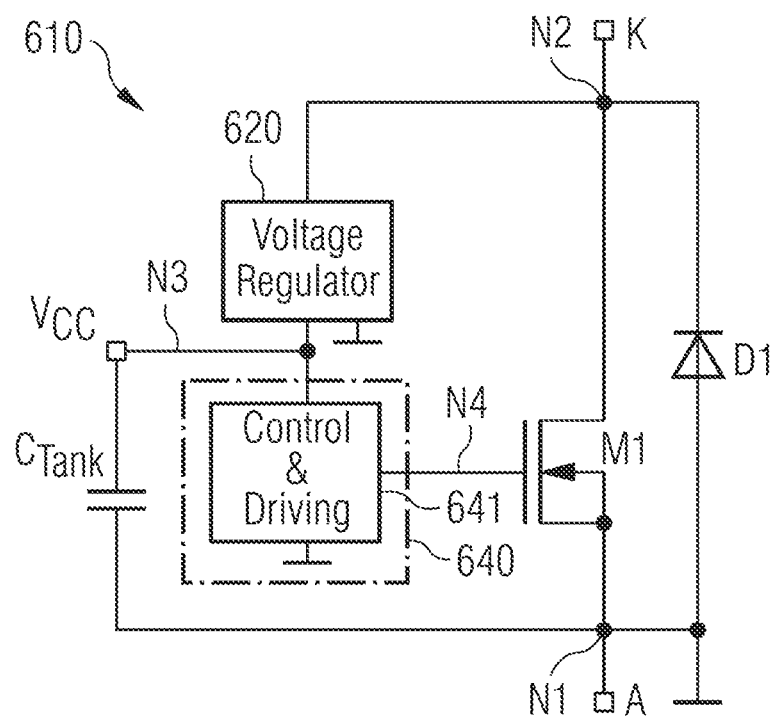
FIG. 6 is a block diagram illustrating an example of the synchronous rectifier of FIG. 1.

FIG. 6 is a block diagram illustrating an example of the synchronous rectifier 600, which may be employed as an example of self-powered synchronous rectifier 100 of FIG. 1. Synchronous rectifier 600 may further include tank capacitor CTank. Synchronous rectifier transistor M1 may include body diode D1. Gate driver 640 may include control and driving circuit 641.

Synchronous rectifier 600 may enable a way for obtaining power supply for synchronous rectifier controllers and/or drivers based on some auxiliary components integrated in the main synchronous rectifier. In some examples, the off state reverse voltage between the drain and source of synchronous rectifier transistor M1 may be used as the potential difference from which to obtain energy for the controller and driving circuit 641 when transistor M1 is in the off state and to charge capacitor Ctank. In some examples, Control and driving circuit 641 is arranged to turn on and off the gate of transistor M1 and to drive the gate of transistor M1 when transistor M1 is to be on. In some examples, the gate of transistor M1 is controlled with a 50% duty cycle signal, but the disclosure is not so limited, and other examples of a signal may be employed. In some examples, the gate of transistor M1 is driven with a pulse width modulated (PWM) signal having a duty cycle of approximately 50%.

The voltage across transistor M1 when M1 is in an "off" state may be used to supply control and driver circuit 641 and to charge capacitor Ctank, as follows in some examples. When the transistor M1 is in an off state, the Vds of transistor M1 is slightly negative. When transistor M1 is in an off state, the voltage at node N2 (at the drain of M1) is very high. Capacitor Ctank is arranged to store energy in order to supply the control and driving circuit 641 when transistor M1 is in the on state. Independently of the reverse voltage value, the supply voltage (Vcc) for control and driver circuit 641 can be regulated to a lower value to allow the use of low voltage technologies for the controller/driver implementation of control and driver circuit 641. Voltage regulator 620 is arranged to decrease the max VKA voltage (i.e., the voltage drop between nodes N1 and node N1), supply Control and driving circuit 641, charge the tank capacitor CTank, and inhibit the discharge of tank capacitor Ctank in the semiperiod when VKA is negative.

Although not shown in FIG. 6, as shown in other figures and as discussed above and below, voltage regulator 620 may include transistor M2. Moreover, transistor M2 and transistor M1 may be formed on the same die. However, driving and sense circuits in control and driver circuit 641 can still be formed on different dies, yet arranged on the same package as each other and/or as transistors M1 and M2, they can be fully monolithic (i.e. on the same die), or can even be separate entities as in a completely discrete solution.

While transistors M1 and M2 may be MOS devices in some examples, other power devices may instead be employed for transistors M1 and M2 in various examples. These examples and others are within the scope and spirit of the disclosure.

Examples of self-powered synchronous rectifier 610 may be employed to provide power supply to any kind of integrated SR and its switching, driving and control circuitry. In various examples, synchronous rectifier 610 can be externally controlled or self-driven and implemented with different power device.

In some examples, the self-powered approach used in synchronous rectifier 610 is based on the use of a section of the synchronous rectifier active device as pass element for a voltage regulator (e.g., voltage regulator 620) and does not require complex external hardware and high voltage technologies for driving and controlling SR power devices. In some examples, synchronous rectifier 610 also provides a modular approach for different voltage classes of the synchronous rectifier. For instance, in some examples, if a driver circuit is designed for a particular voltage level, the driver circuit does not have to be changed if a different voltage level is employed, and the same driver circuit that is designed for a particular voltage level can be used for another voltage level. In this way, no matter which particular high voltage is being used, the same driver can be used to drive the synchronous rectifier and the driver does not have to be redesigned.

In some examples, a self-powered approach makes synchronous rectifier 610 a true active diode and the system designer does not need to care for its supply.

Uses for synchronous rectifier 610 are not restricted to applications where one terminal of the synchronous rectifier is connected to ground. For instance, some examples of synchronous rectifier 610 can also be deployed within applications where synchronous rectifiers are used in high-side (HS) environments.

Also, examples of synchronous rectifier 610 may be employed in applications where hardware simplification and reduction is required, because such applications may not be able to afford to implement the cumbersome and complex circuitry required to supply the synchronous rectifier. For instance, in applications involving solar micro inverters, self-powering for the synchronous rectifiers may provide higher reliability, and in applications involving welding, self-powering for the synchronous rectifiers may provide lighter equipment to carry.

Figure 7:
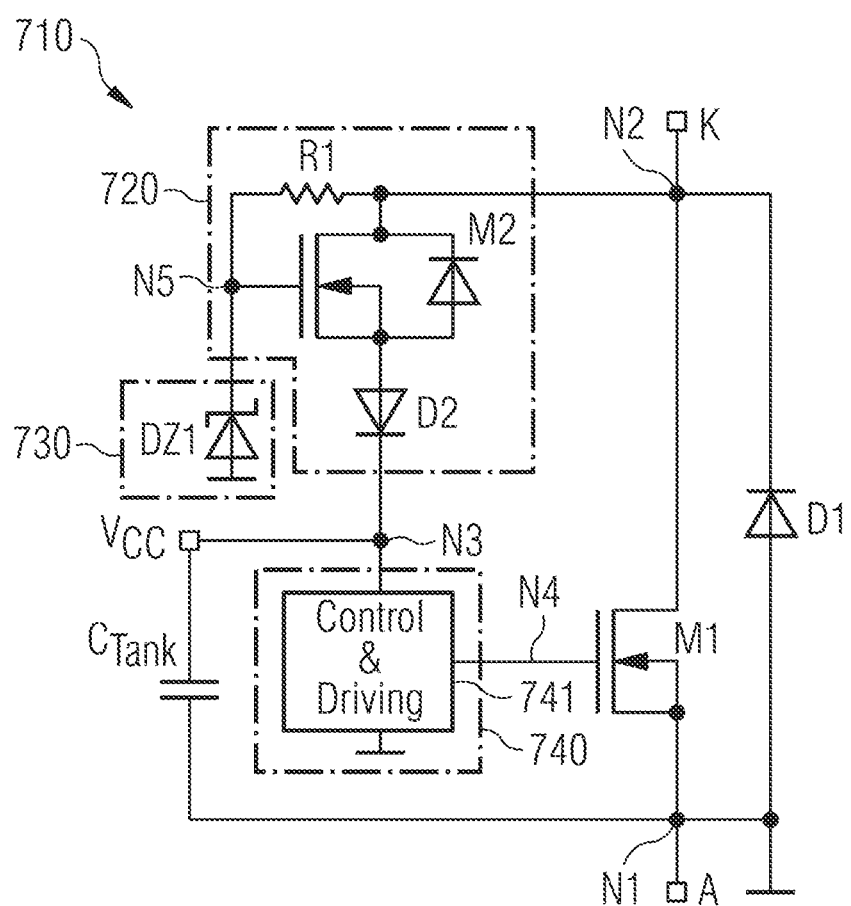
FIG. 7 is a block diagram illustrating an example of the synchronous rectifier of FIG. 6.

FIG. 7 is a block diagram illustrating an example of synchronous rectifier 710, which may be employed as an example of synchronous rectifier 610 of FIG. 6. In some examples, voltage regulator 720 includes transistor M2, diode D2, and resistor R1. In some examples, clamping device 630 includes Zener diode DZ1.

In some examples, as illustrated in FIG. 7, voltage regulator 720 is arranged as a simple open loop linear regulator that is arranged to operate as follows in some examples. Zener diode DZ1 is arranged to provide the reference to voltage regulator 720. Resistor R1 is arranged as a bias element for DZ1 and as a pull-up and/or bias for the gate of transistor M2. In some examples, resistor R1 is a high ohmic resistor. Transistor M2 is a power device that is arranged as a pass element that must withstand the voltage difference between the voltage at node N2 and the regulated Vcc potential. Diode D2 is arranged to avoid discharging the energy stored in capacitor CTank while transistor M1 is on and the potential at node N2 drops below zero. That is, diode D2 is arranged to isolate capacitor Ctank from node N2 while transistor M1 is on.

When transistor M1 turns off, the voltage at node N2 moves up, resistor R1 is pulled up, and current starts flowing through Zener diode DZ1. Accordingly, the voltage at node N5 at the gate of transistor M2 moves up. The voltage at node N5 moves up until the voltage at node N5 reaches Vcc plus a diode drop across diode D2. At this point, transistor M2 starts conducting and transferring current from node N2 into capacitor Ctank or into control and driving circuit 741.

When transistor M1 turns on, the voltage at node N2 moves down, the voltage at the drain of transistor M2 also moves down, and brings the gate of transistor M2 down as well, until diode D2 is in a reverse bias condition. When diode D2 is in reverse bias, there is no current flowing into tank capacitor Ctank, and transistor M2 is completely off, so that no current can flow back from capacitor Ctank into node N1 or node N2. Accordingly, node N2 is dynamically moved up or down and dynamically turns on and off transistor M2 to conduct current to tank capacitor Ctank but not from tank capacitor Ctank to node N1 or node N2.

Transistor M2 is integrated on the same die together with transistor M1. In some examples, pull-up resistor R1, and possibly other components, are also integrated on the same die as transistors M1 and M2. Transistors M1 and M2 have the same voltage class. The voltage that transistor M2 can withstand is the same voltage that transistor M1 can withstand.

In various examples, clamping circuit 730 may include a Zener diode, as shown, or can be a different circuit than a Zener diode or include additional components. For example, clamping circuit 730 may be a more complex reference/clamp structure than just a Zener diode.

In various examples, resistor R1 may be replaced with a different component, such as a capacitor, or other suitable element for biasing the gate of transistor M2. In various examples, diode D2 may be replaced with a different element that operates as a diode, such as a transistor configured as a diode.

Although FIG. 7 shows one particular example of voltage regulator 720, any suitable voltage regulator structure may be employed in which transistors M1 and M2 are on the same die.

Control and driving circuit 741 is arranged to determine when to turn transistor M1 on, to determine when to turn transistor M1 off, and to drive transistor M1 when transistor M1 is on. Some examples of a power converter that includes synchronous rectifier 710 may include only one synchronous rectifier 710. Other examples of a power converter that includes synchronous rectifier 710 may include two or more synchronous rectifiers 710. Some examples include two synchronous rectifiers that are approximately 180 degrees out of phase.

In some of these examples that include two synchronous rectifiers that are approximately 180 degrees out of phase, control and driver circuit 871 may determine the turn-on time as follows. When transistor M1 is off, and the other, 180 degree-out-of-phase synchronous rectifier turns off, the voltage at the drain of transistor M1 will start to go down very quickly. The voltage at the drain of transistor M1 moves down until diode D1 is forward-biased, at which point diode D1 starts to bring itself up with the voltage at the drain of transistor M1. In this way, the voltage at the gate of transistor M2 follows the voltage at node N2 within one diode voltage drop. Accordingly, in these examples, the voltage at the gate of transistor M2 can be monitored to determine when to turn on M1. As soon as the gate of transistor M2 drops one diode drop below VCC, the transistor M1 may be turned on. Alternatively, in some examples, the source of M2 may be monitored in a similar manner. In some examples, transistor M1 is turned on when a source voltage of transistor M2 is less than a pre-determined voltage level.

Figure 8:
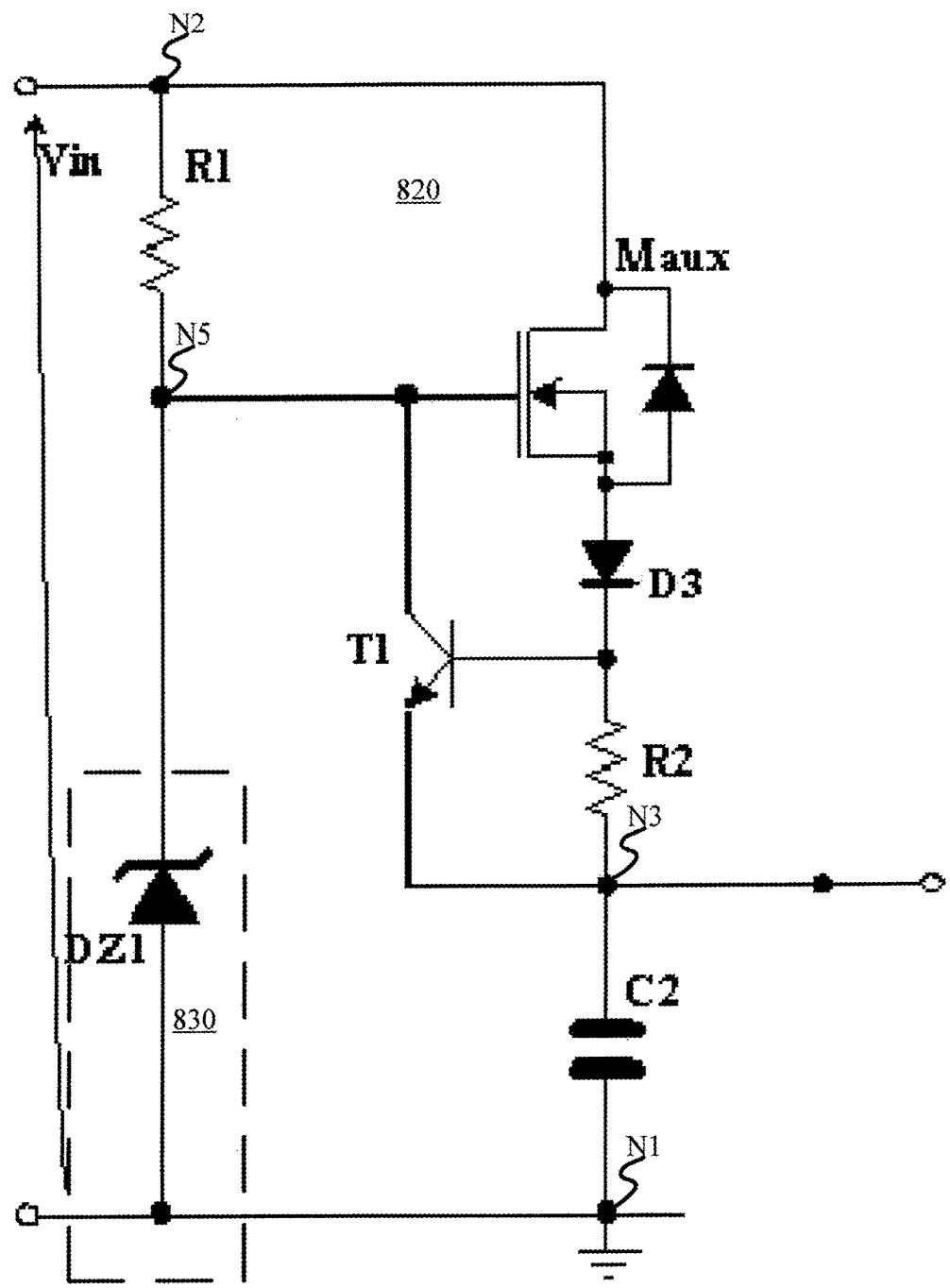
FIG. 8 is a block diagram illustrating another example of the voltage regulator and clamping device of FIG. 6.

FIG. 8 is a block diagram illustrating another example of voltage regulator 820 and clamping device 830, which may be employed as examples of voltage regulator 620 and clamping device 630 FIG. 6. Clamping device 830 may include Zener diode DZ1. Voltage regulator 820 may include transistor Maux, diode D1, transistor T1, and resistors R1 and R2. Transistor Maux is an example of transistor M2 of FIG. 6.

In some examples, voltage Vin (the voltage between nodes N1 and N2) is a square wave. In some examples, voltage regulator 820 is arranged as a low drop linear regulator using an n-channel device (e.g., transistor T1) as a pass element.

One such example is illustrated in FIG. 8, in which diodes D1 and D2, capacitor C1 and the capacitance Cdg of Maux are arranged to operate together as a charge pump that supplies the gate of transistor Maux, where transistor Maux is arranged as a pass element. In some examples, the charge pump that includes diodes D1 and D1, capacitor C2, and the capacitance Cdg of Maux is driven by the square wave across nodes N1 and N2 (voltage Vin).

Figure 9:
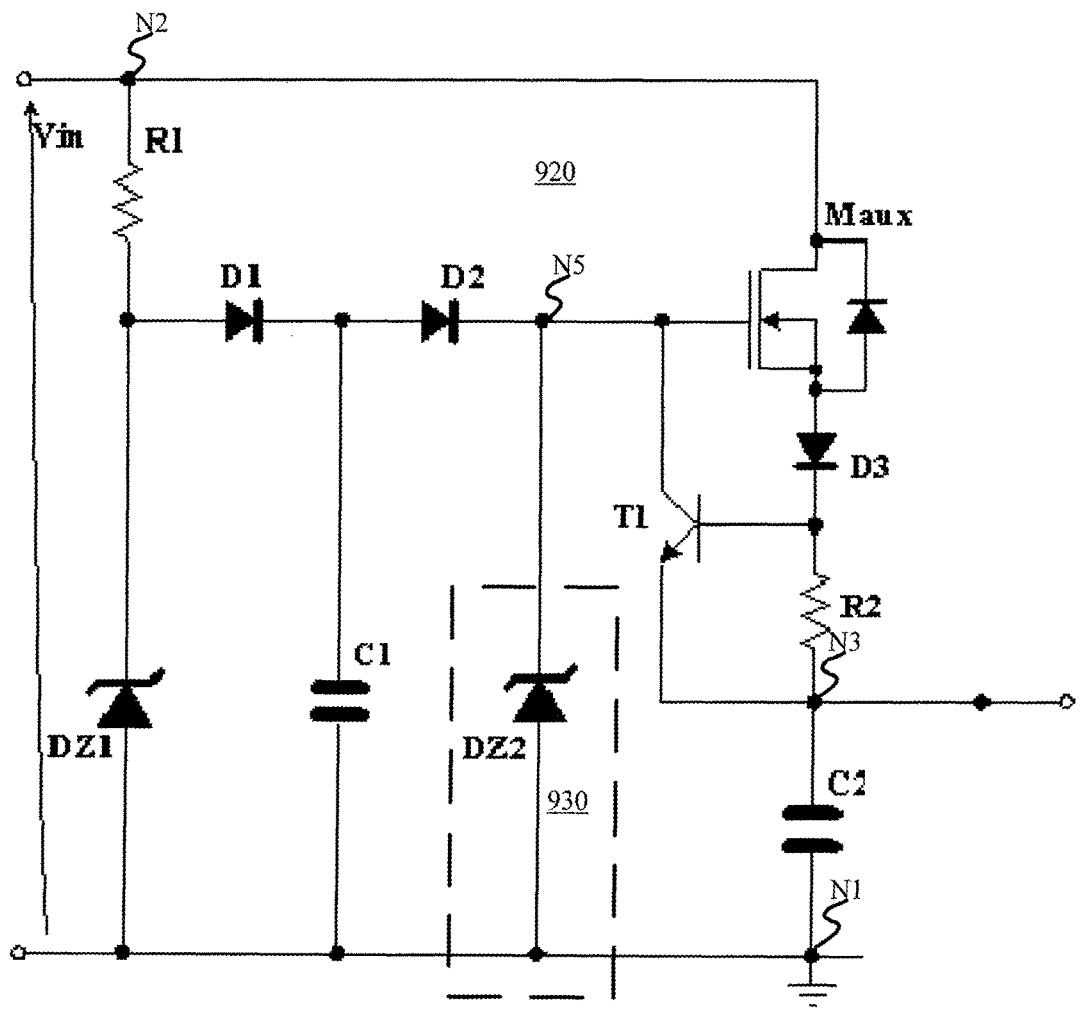
FIG. 9 is a block diagram illustrating yet another example of the voltage regulator and clamping device of FIG. 6.

FIG. 9 is a block diagram illustrating an example of voltage regulator 920 and clamping device 930, which may be employed as examples of voltage regulator 620 and clamping device 630 of FIG. 6. Clamping device 930 may include Zener diode DZ2. Voltage regulator 820 may include transistor Maux, diodes D1 and D2 and D3, transistor T1, Zener diode D1, capacitors C1 and C2, and resistors R1 and R2. Transistor Maux is an example of transistor M2 of FIG. 6.

Voltage regulator 920 is similar to voltage regulator 820 of FIG. 8, but includes another example of a charge pump. FIG. 9 illustrates a different way to bootstrap the gate of the pass element and to store charge on it to realize a low drop regulator with n-channel device. In various other examples, any other suitable way to bootstrap the gate of the pass element and to store charge on it to realize a low-dropout regulator with n-channel device may be employed. These examples and others are within the scope and spirit of the disclosure.

Various types of voltage regulators that are examples of voltage regulator 120 of FIG. 1 and/or voltage regulator 620 of FIG. 6 have been illustrated in the various figures and discussed above. However, the disclosure is not limited, and other suitable types of voltage regulators may be employed, such a linear voltage regulator, a charge pump, a switching regulator, and/or the like.

Figure 10:
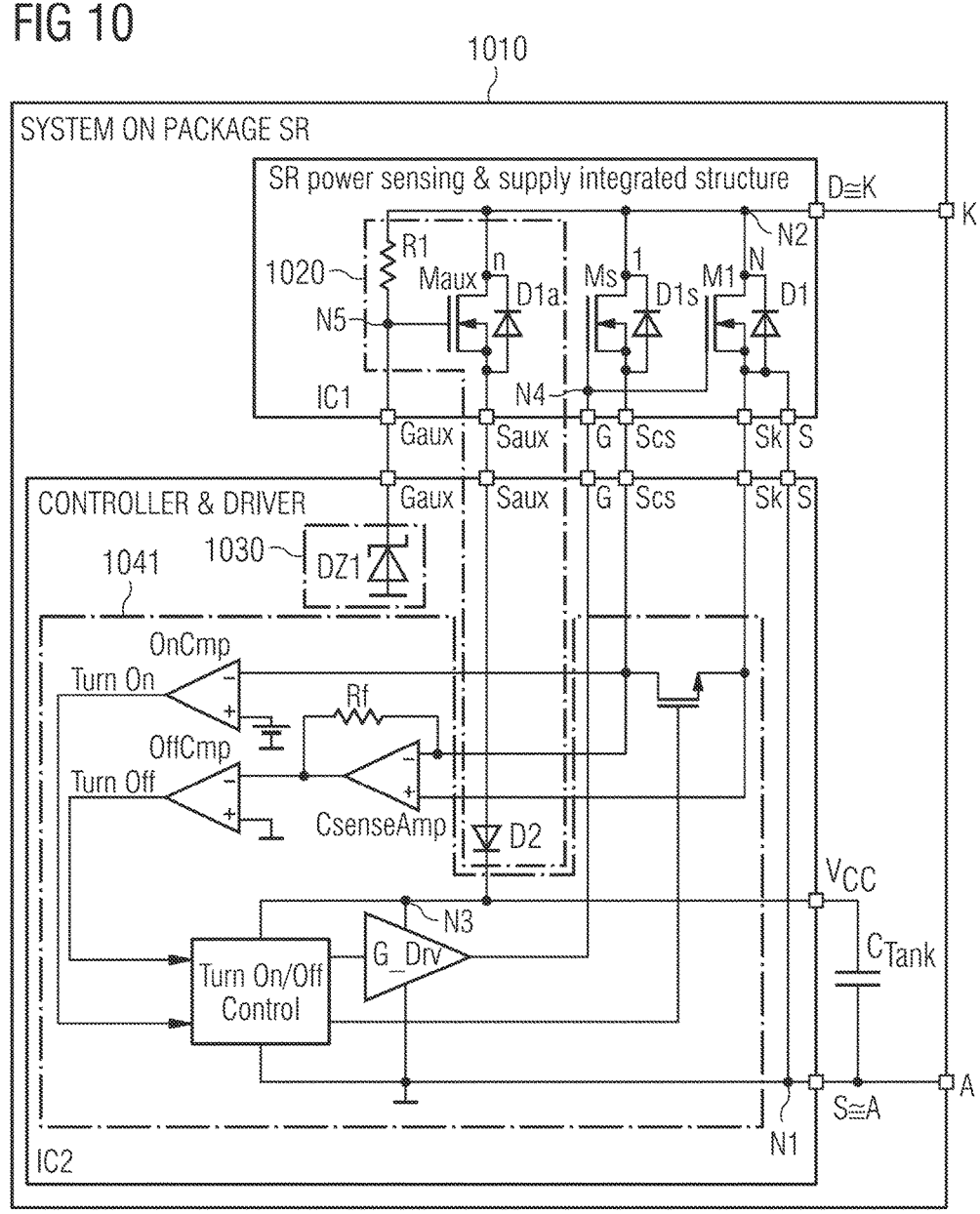
FIG. 10 is a block diagram illustrating an example of the synchronous rectifier of FIG. 7.

FIG. 10 is a block diagram illustrating an example of synchronous rectifier 1010, which may be employed as an example of synchronous rectifier 710 of FIG. 7. In some examples, synchronous rectifier 1010 further includes transistor Ms. Transistor Maux further includes body diode D1a, and transistor Ms further includes body diode D1s. In some examples, transistors M1, Ms, Maux, and R1 are integrated onto integrated circuit IC1, and Zener diode DZ1, diode D2, capacitor control and driving circuit 1041 are integrated onto integrated circuit IC2. In some examples, Control and driver circuit 1041 includes comparator onCmp, comparator OffCmp, sense amplifier CsenseAmp, resistor Rf, gate driver G_Drv, and transistor M3.

In some examples, IC1 is a high-voltage chip implemented in a technology for discrete vertical power mos. In some examples, transistor M1 is arranged to operate as the main synchronous rectifier (SR) power device, transistor Ms is arranged to operate as a current sense element, transistor Maux is arranged to operate as a linear regulator pass element, and resistor R1 is arranged to operate as a bias resistor for transistor Maux.

In some examples, IC2 is a low voltage chip for controlling and driving the transistor M1. In some examples, amplifier CsenseAmp is arranged to measure a source current of transistor M1. In some examples, comparator OnCmp is arranged to detect turn-on instances. In some examples, comparator OffCmp is arranged to detect turn-off instances. In examples, turn on/off control block 1060 is includes logic to manage on and off commands and safety signals. In some examples, gate driver circuit G_Drv is arranged to operate as a driving circuit for the gate of transistor M1.

By being partitioned among two ICs low voltage for control/driving and high voltage for power supply, synchronous rectifier 1010 may provide a very good flexibility and high performance and control. Synchronous rectifier 1010 may be arranged as a low-loss diode. Also, voltage classes may be changed easily only by replacing IC1. IC2 may use low-voltage technology. In some examples, IC2 need not be changed with different voltage classes, and may be used with any suitable voltage class, because IC1 provides Vcc at a suitable voltage level for IC2 regardless of the voltage level received by IC1. Additionally, a low voltage technology with high logic density for IC2 may allow implementing sophisticated and high performance control, monitoring, and communication functions.

In some examples, tank capacitor CTank is integrated into the system package. In some of these examples, synchronous rectifier 1010 is a two-terminal device that may be used as a one-to-one replacement of a classic diode.

In some examples, having an integrated supply allows the possibility to modulate the driving voltage of synchronous rectifier 1010 according to the operating condition and to maximize the system efficiency. Several sources of information can be used for this purpose, including current, temperature, logic signals from external controllers, and/or the like.

In examples of synchronous rectifier 1010 in which current sense is available to the Control and driving circuit 1041, the gate driver G_Drv may output the driving voltage at node N4 such that the driving voltage is proportional to the load current. In this example, if the power converter (e.g., power converter 100 of FIG. 1) is working with a very low load, gate driver G_Drv may cause the driving voltage to be decreased in order to reduce the switching losses at the expense of a slight increase of the conduction losses. Conversely, for very high loads, the conduction losses are predominant, and in this case gate driver G_Drv may increase the driving voltage.

In some examples, gate driver G_Drv may be arranged to modulate the driving voltage according to the chip temperature provided by an integrated sensor. In these ways and others, gate driver G_Drv may be arranged to modulate the SR driving voltage according to available information to optimize system efficiency.

In some examples, comparator OnCmp detects the on time for synchronous rectifier 1010 in the low voltage domain exploiting the combined actions of the auxiliary MOSFET Maux, body diode D1a, and diode D1, where diode D1 is arranged to operate as an anti-discharging diode for capacitor Ctank. The on time detection is performed by sensing the falling edge of the source voltage of auxiliary transistor Maux.

The linear regulator structure for voltage regulator 1020 may be used to detect the on-time for transistor M1 as follows in some examples. Transistor M1 is turned on when VKA drops below the potential at node N1, as the body diode D1 starts conducting. As illustrated in FIG. 10, due to the action of body diodes D1a and D2, a similar drop is present at the same time at the source of transistor Maux, i.e. on the voltage VKA_clamp. The key difference between signals VKA and VKA_clamp is that VKA is a high voltage signal whereas VKA_clamp is a clamped low-voltage copy of VKA, while for both of them the edges happen at approximately the same time.

Accordingly, in some examples, signal VKA_clamp can be easily managed by the controller circuits to detect the on time and, although bounded in a low-voltage domain, signal VKA_clamp is still a signal with amplitude of some volts, which makes the detection relatively straightforward and robust.

In some examples, comparator OnCmp is arranged to compare the two voltages at the inputs of comparator OnCmp with each other, and to provide signal TurnOn in response to the comparison. In some examples, comparator OffCmp is arranged to compare the two voltages at the inputs of comparator OffCmp with each other, and to provide signal TurnOff in response to the comparison. Turn on/off control block 10xx is arranged to receive signals TurnOn and TurnOff, and to control the turn on and turn off of transistor M1 based on signal TurnOn and TurnOff. In some examples, turn on/turn off block 1060 may consist simply of an RS latch so that a value is set when signal TurnOn is asserted, and reset when signal TurnOff is assert. In other examples, turn on/off may include additional logic, including safety logic in some examples.

Because transistors M1, Maux, and Ms share a common drain, in some examples transistors M1, Maux, and Ms may be implemented in a very efficient manner by a vertical HEXFET technology. Also, in some examples, resistor R1 may be realized with the gate poly layer of IC1. In these examples, all of the high voltage devices necessary for synchronous rectifier 1010 and the supply section of synchronous rectifier 1010 may be placed on the same piece of silicon.

In some examples, the integration of transistors M1 and Maux and possibly other components allows low-voltage technologies to be used for control and driving circuits. In some examples, the only external component is capacitor Ctank, while in some examples, capacitor Ctank is integrated in the same package and there are no external components. Further, power devices of different voltage classes may be realized by selecting the proper voltage class for transistors M1 and Maux without any change in IC2. Also, self-powered synchronous rectifier 1010 may operate as a true active diode with a system-in-package solution. Additionally, various examples of synchronous rectifier 1010 can be used for low-side applications and various examples of synchronous rectifier 1010 can be used for high-side applications.

Many suitable variations are possible for synchronous rectifier 1010. For example, although capacitor CTank is shown as integrated into IC2, in other examples, capacitor Ctank is a discrete element that is separate from IC2. Also, although Zener diode DZ1 and diode D2 are shown are part of IC2, in other examples, one or both of Zener diode DZ1 and diode D2 may be external components, or may be part of IC1.

FIG. 11 is a block diagram illustrating an example of synchronous rectifier 1110, which may be employed as another example of synchronous rectifier 710 of FIG. 7. Synchronous rectifier 1110 is similar to synchronous rectifier 1010 of FIG. 10, except that, in the example of synchronous rectifier 1110 illustrated in FIG. 11, turn-on detection is accomplished by probing the voltage at the source of transistor Maux. Also, in synchronous rectifier 1110, capacitor Ctank is an external component as opposed to being integrated onto IC2 as shown in FIG. 10. Capacitor Ctank may be either internal or external in various examples of both synchronous rectifier 1110 and synchronous rectifier 1010 of FIG. 10.

Various examples have been described. These and other examples are within the scope of the following claims.

What is claimed is:

1. A device, comprising:
a power converter arranged in an isolated topology, wherein the power converter includes:
a primary side; and
a secondary side, wherein the secondary side includes a self-powered synchronous rectifier, and wherein the self-powered synchronous rectifier includes:
a synchronous rectifier transistor having at least a drain, a source, and a gate;
a voltage regulator including at least an input that is coupled to the drain of the synchronous rectifier transistor, and an output, wherein the voltage regulator includes an auxiliary transistor having at least a drain that is coupled to the drain of the synchronous rectifier transistor, a source, and a gate, wherein the auxiliary transistor is on a same die as the synchronous rectifier transistor;
a clamping device having at least an output that is coupled to the gate of the auxiliary transistor; and
a gate driver circuit having at least a power supply input that is coupled to the output of the voltage regulator, and an output that is coupled to the gate of the synchronous rectifier transistor, wherein the gate driver circuit outputs a driving voltage at the output of the gate driver circuit to control a current at the synchronous rectifier transistor, wherein the gate driver circuit is configured to receive energy from an off state reverse voltage between the drain of the synchronous rectifier transistor and the source of the synchronous rectifier transistor when the synchronous rectifier transistor is in an off state.

2. The device of claim 1, wherein the voltage regulator includes at least one of a linear regulator, a switching regulator, or a charge pump.

3. The device of claim 1, wherein the synchronous rectifier transistor includes a power field effect transistor (FET), the synchronous rectifier transistor has a voltage class, the auxiliary transistor is a power FET, the auxiliary transistor has a voltage class, and the voltage class of the auxiliary transistor is the same voltage class as the synchronous rectifier transistor.

4. The device of claim 1, wherein the power converter includes at least one of a flyback converter or an LLC converter.

5. The device of claim 1, wherein the gate driver circuit generates the driving voltage based on a voltage at the source of the auxiliary transistor.

6. The device of claim 1, wherein the auxiliary transistor is arranged to operate as a pass element of the voltage regulator.

7. The device of claim 1, further comprising a tank capacitor that is coupled between the source of the synchronous rectifier transistor and the power supply input of the gate driver circuit.

8. The device of claim 1, wherein the voltage regulator further includes a diode that is coupled between the source of the auxiliary transistor and the power supply input of the gate driver circuit.

9. The device of claim 1, wherein the voltage regulator further includes a device that is configured to operate as a diode that is coupled between the source of the auxiliary transistor and the power supply input of the gate driver circuit.

10. The device of claim 1, wherein the voltage regulator further includes a bias element that is coupled between the drain of the auxiliary transistor and the source of the auxiliary transistor.

11. The device of claim 10, wherein the bias element includes a resistor.

12. The device of claim 1, wherein the gate driver circuit includes turn-off logic that is arranged to determine when to turn the synchronous rectifier transistor off, turn-on logic that is arranged to determine when to turn the synchronous rectifier transistor on, and a driver that is arranged to drive the gate of the synchronous rectifier transistor when the turn-on logic has determined that the synchronous rectifier transistor is to be turned on.

13. The device of claim 12, wherein the turn-on logic is arranged to determine to turn the synchronous rectifier transistor on when a voltage at the source of the auxiliary transistor is less than a pre-determined voltage level.

14. A method, comprising:
using a gate driver circuit to drive a gate of a synchronous rectifier transistor, wherein the synchronous rectifier transistor is part of a secondary side of a power converter having an isolated topology and wherein the gate driver circuit outputs a driving voltage at the gate of the synchronous rectifier transistor to control a current at the synchronous rectifier transistor;
making a determination as to when to turn on the synchronous rectifier transistor;
using the gate driver circuit to turn on the synchronous rectifier transistor based on the determination as to when to turn on the synchronous rectifier transistor;
making a determination as to when to turn off the synchronous rectifier transistor; and
using the gate driver circuit to turn off the synchronous rectifier transistor based on the determination as to when to turn off the synchronous rectifier transistor;
using a voltage regulator to convert a voltage at a drain of the synchronous rectifier transistor into a regulated voltage, wherein the voltage regulator includes an auxiliary transistor having a drain that is coupled to the drain of the synchronous rectifier transistor, and wherein the auxiliary transistor is on a same die as the synchronous rectifier transistor, wherein making the determination as to when to turn on the synchronous rectifier transistor includes determining that the synchronous rectifier transistor should be turned on when a voltage at a source of the auxiliary transistor is less than a pre-determined voltage level;
clamping a voltage at a gate of the auxiliary transistor; and
providing the regulated voltage to the gate driver circuit as a power supply of the gate driver circuit.

15. The method of claim 14, wherein driving the gate of the synchronous rectifier transistor includes driving the gate of the synchronous rectifier transistor with a pulse width modulation (PWM) signal have a duty cycle of approximately 50%.

16. The method of claim 14, further comprising:
using the auxiliary transistor to charge a tank capacitor when the synchronous rectifier transistor is off.

17. The method of claim 16, further comprising:
isolating the tank capacitor from the auxiliary transistor when the synchronous rectifier transistor is on.

18. The method of claim 14, wherein the gate driver circuit is arranged to drive the gate of the synchronous rectifier transistor by outputting a driving voltage to the gate of the synchronous rectifier transistor when the synchronous rectifier transistor is on, and wherein driving the gate of the synchronous rectifier further includes modulating the driving voltage based on at least one of a load current, a temperature, or at least one external logic signal.

\* \* \* \* \*